United States Patent [19]

Hiraiwa

[11] Patent Number: 4,823,628

[45] Date of Patent: Apr. 25, 1989

[54] SYNCHROMESH TRANSMISSION SUITED FOR USE AS AN AUTOMOTIVE AUTOMATIC TRANSMISSION

[75] Inventor: Kazuyoshi Hiraiwa, Atsugi, Japan

[73] Assignee: Nissan Motor Co., Ltd., Japan

[21] Appl. No.: 454,005

[22] Filed: Dec. 28, 1982

[30] Foreign Application Priority Data

Jan. 8, 1982 [JP] Japan .................................. 57-926

[51] Int. Cl.⁴ .............................................. F16H 3/08
[52] U.S. Cl. ........................................ 74/330; 74/730; 74/333
[58] Field of Search ................. 74/330, 331, 339, 340, 74/333, 334, 375, 374, 373, 363, 362, 364, 365, 730

[56] References Cited

U.S. PATENT DOCUMENTS

| | | | |
|---|---|---|---|
| 2,570,192 | 10/1951 | Beckwith | 74/330 |
| 2,668,453 | 2/1954 | Banker | 74/330 |
| 2,722,844 | 11/1955 | Dodge | 74/730 X |
| 2,844,974 | 7/1958 | Saives | 74/330 X |
| 2,897,690 | 8/1959 | Maier | 74/330 X |
| 3,691,861 | 9/1972 | Sturmer | 74/333 X |
| 4,194,608 | 2/1980 | Usui et al. | 192/92 |
| 4,311,067 | 1/1982 | Froumajou | 74/330 |

FOREIGN PATENT DOCUMENTS

| | | |
|---|---|---|
| 0029711 | 11/1980 | European Pat. Off. . |
| 0034411 | 1/1981 | European Pat. Off. . |
| 0079879 | 5/1983 | European Pat. Off. .......... 74/330 |
| 720884 | 4/1942 | Fed. Rep. of Germany . |
| 2103317 | 2/1983 | United Kingdom ............. 74/330 |

OTHER PUBLICATIONS

"Automotive Engineering", Jun. 1980, pp. 87–88, p. 1, lines 12–21 and p. 2, last paragraph.

*Primary Examiner*—Dirk Wright
*Attorney, Agent, or Firm*—Leydig, Voit & Mayer

[57] ABSTRACT

A countershaft synchromesh type transmission is arranged to have first and second groups of input and output gear arranged on either side of a set of input and output gears which produce a given speed ratio. With this, the coupling of first and second clutches enables both sequential as well as non-sequential gear shifting between the groups of gears and/or the gear located between the groups.

11 Claims, 2 Drawing Sheets

SYNCHROMESH TRANSMISSION SUITED FOR USE AS AN AUTOMOTIVE AUTOMATIC TRANSMISSION

BACKGROUND OF THE INVENTION

1. Field of the Invention

The present invention relates generally to a counter shaft synchromesh type transmission and more specifically to an improved arrangement suited for use as an automatic automotive transmission.

2. Description of the Prior Art

In a previously proposed synchromesh type transmission disclosed in "Automotive Engineering" June 1980 pages 87 and 88 (hereby incorporated by reference), it has been possible to perform so called "hot shifts" between gears by setting synchronizers and selectively engaging and disengaging first and second clutches. However, this arrangement has suffered from the drawback that a sequential 1-2-3-4 etc., up and down shift must be performed, thus rendering it impossible to skip a gear and shift from first to third or vice versa, for example.

SUMMARY OF THE INVENTION

It is therefore an object of the present invention to provide a synchromesh type automatic transmission wherein it is possible to skip gears and perform non-sequential up and down shifts when desired.

The present invention accordingly features a countershaft synchromesh type transmission which is arranged to have first and second groups of input and output gears arranged on either side of a given selected set of input and output gears which produce a given speed ratio. With this, the coupling of first and second clutches enables both sequential as well as non-sequential gear shifting between the groups of gears and/or the gear located between the groups.

More specifically, the present invention takes the form of a transmission comprising an input shaft operatively connected with a source of rotational energy, a first intermediate shaft rotatably disposed about the input shaft, first clutch means for selectively providing a drive connection between said input shaft and the first intermediate shaft, a second intermediate shaft rotatably disposed about the input shaft, second clutch means for selectively providing a drive connection between the input shaft and the second intermediate shaft, an output shaft, a first input gear located between the first and second intermediate shafts and arranged to be rotatable with respect to the input shaft, a first output gear on the output shaft, the first output gear being arranged to be in constant mesh with the first input gear, a first group of intermeshing input and output gears operatively associated with the first intermediate shaft and the output shaft respectively, a second group of intermeshing input and output gears operatively associated with the second intermediate shaft and the output shaft respectively, and synchronizer means for selectively connecting input and output gears with the drive shaft, the first and second intermediate shafts and the output shaft in a manner for selectively producing a predetermined number of speed change ratios between the input and output shafts.

DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 1:
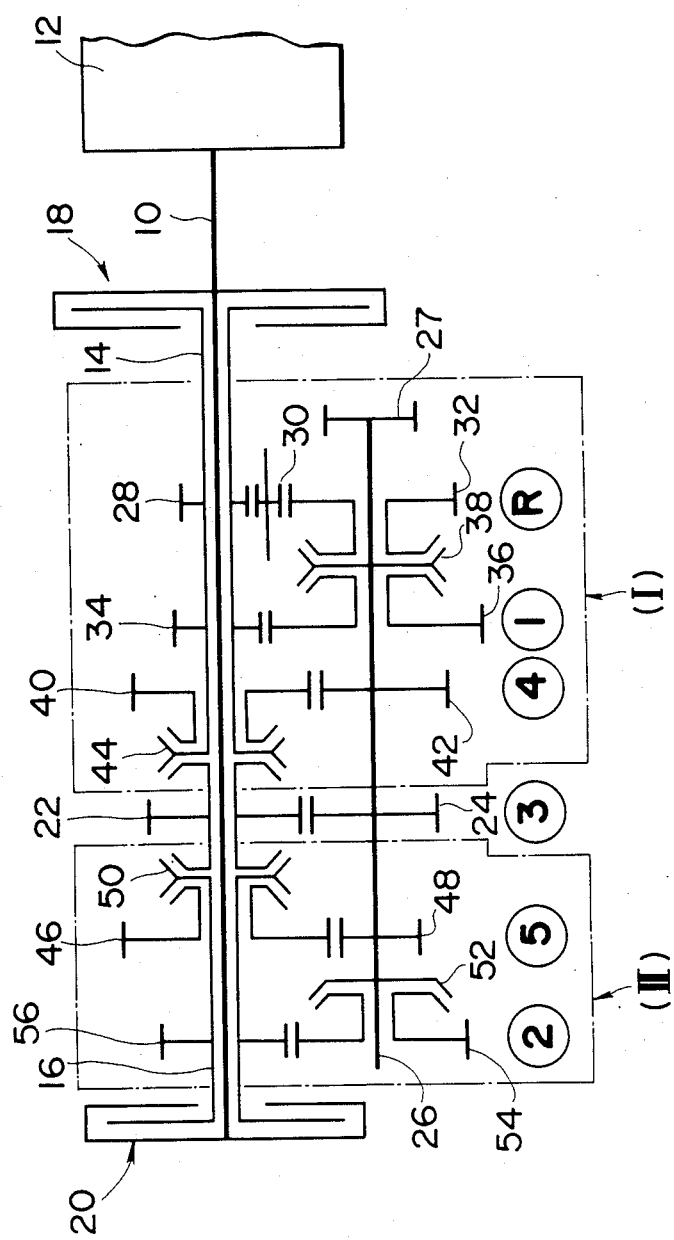
FIG. 1 is a schematic drawing of a first embodiment of the present invention.

A first embodiment of the present invention which takes the form of a five speed transmission (viz., a transmission having five forward speeds and one reverse speed) is shown in FIG. 1. In this arrangement an input shaft 10 is operatively connected to a source of rotational energy such as an internal combustion engine or the like 12. Rotatably disposed about the input shaft are first and second intermediate shafts 14, 16. As shown, the first intermediate shaft 14 is connected with a first clutch 18 which is operative to selectively connect the intermediate shaft 14 with the input shaft 10. Similarly, the second intermediate shaft 16 is operatively connected to a second clutch 20 by which it may be selectively connected with the input shaft 10 for synchronous rotation therewith. A gear 22 which functions as an input gear is, as shown, rotatably mounted on said input shaft 10 between said first and second intermediate shafts 14, 16. This gear (22) is arranged to be in constant mesh with a gear 24 which functions as an output gear and which is fixedly mounted on an output shaft 26 disposed in a parallel relationship with the input and intermediate shafts 10, 14, 16. A drive pinion 27 is provided on the end of the output shaft 26 for connection with a final drive unit or the like (not shown).

First and second groups (I) and (II) of "input" and "output" gears are installed on the first intermediate shaft 14, second intermediate shaft 16 and the output shaft 26. As shown, the first group (I) is located between the first input and output gears 22, 24 and the first clutch 18, while the second group (II) is located on the other side of said input and output gears 22, 24. In this first embodiment, the first group (I) includes, as shown, a reverse input gear 28 fixed to said first intermediate shaft 14 for synchronous rotation therewith, an idler gear 30, a reverse output gear 32 which is rotatably mounted on the output shaft 26, a first speed ratio input gear 34 fixed to the first intermediate shaft 14 and a first speed ratio output gear 36 rotatably mounted on said output shaft 26 adjacent said reverse output gear 32. Interposed between these gears (32, 36) is a synchronizer 38 which may be selectively operated to establish a drive connection between either of the reverse or first speed ratio output gears 32, 36 and the output shaft 26. The first group (I) further includes a fourth speed ratio set of input and output gears 40, 42. In this case the input gear 40 is rotatably mounted on the first intermediate shaft 14 while the corresponding output gear 42 is fixed to the output shaft 26. A second synchronizer 44 is arranged at the end of the first intermediate shaft 14 between the input gears 22, 40. This synchronizer is arranged to selectively provide a drive connection between one of said input gears 22, 40 and the first intermediate shaft 14. It should be noted that the input and output gears 22, 24 in this embodiment are adapted to provide a third speed ratio of the transmission.

The second group (II) in this embodiment includes a fifth speed ratio input gear 46 rotatably mounted on the second intermediate shaft 16 and a corresponding output gear 48 fixedly mounted on the output shaft 26. A synchronizer 50 is arranged at the end of the second intermediate shaft 16 for selectively engaging one of the third speed ratio and fifth speed ratio input gears 22, 46. A fourth synchronizer 52 is adapted to selectively connect a second speed output gear 54 to the output shaft 26. The corresponding second speed input gear 56 is, as shown, fixed to the second intermediate shaft 16.

The operation of this embodiment is as follows:

To initially start the vehicle in the forward direction from standstill, the first gear ratio is selected by moving the synchronizer 38 to engage the output gear 36 and subsequently engaging the first clutch 18. This establishes a power transmission path including the first clutch 18, first intermediate shaft 14, first speed ratio input gear 34, output gear 36, synchronizer 38 and the output shaft 26.

In preparation for a 1-2 shift the synchronizer 52 is moved to engage the output gear 54 with the output shaft 26. To carry out the shift, the second clutch 20 is coupled and the first (18) uncoupled. This establishes a new power transmission path comprising: input shaft 10, second clutch 20, second intermediate shaft 16, second speed ratio input gear 56, output gear 54, synchronizer 52 and output shaft 26. It should be noted that the upshift can effected with the power output of the transmission remaining essentially uninterrupted.

In preparation for a 2-3 shift the synchronizer 44 is moved to couple the input gear 22 with the first intermediate shaft 14. Subsequent coupling of the clutch 18 and uncoupling of the clutch 20 effects the shift establishing a power transmission path of: clutch 18, first intermediate shaft 14, synchronizer 44, input and output gears 22, 24.

A 3-4 shift is accomplished by firstly coupling the input gear 22 with the second intermediate shaft 16 via the synchronizer 50, coupling clutch 20 and uncoupling clutch 18. This maintains the third gear ratio and permits preparation for the 3-4 shift which involves moving the coupling sleeve of the synchronizer 44 from the position wherein it couples the input gear 22 with the first intermediate shaft 14 to a position wherein it couples the fourth speed ratio input gear 40 thereto. Subsequent coupling of the clutch 18 and uncoupling of the clutch 20 produces the fourth speed ratio wherein power is transmitted through the input shaft 10, clutch 18, first intermediate shaft 14, input gear 40 and output gear 42.

The 4-5 shift is carried out by coupling the second intermediate shaft 16 with the input gear 46 via synchronizer 50, coupling clutch 20 and uncoupling clutch 18.

In the case that a non-sequential gear shift is required such as a 5-3 downshift, the synchronizer 44 is conditioned to couple the input gear 22 with the first intermediate shaft 14 and the clutch 18 coupled while the clutch 20 is uncoupled.

In the case of a 3-1 downshift wherein the clutch 18 is coupled and power is being delivered through the input shaft 10, the clutch 18, first intermediate shaft 14, synchronizer 44 and gears 22, 24; firstly the synchronizer 50 is moved to couple the input gear 22 with the second intermediate shaft 16 and the clutch 20 engaged. This maintains the third gear ratio and permits the clutch 18 to be uncoupled, the synchronizer 38 operated to engage the output gear 36 with the output shaft 26. Coupling the clutch 18 and uncoupling the clutch 20 completes the shift from third to first gear.

From the above it will be appreciated that shifts may be made from a gear of one group to a gear in the other to group or from a gear in one group to third (or vice versa) without any interruption of power transmission. In fact the only so called "hot shifts" that cannot be made with the present embodiment are a 2-5 and a 1-4 shift. However, as these shifts involve a jump of three ratios the need for same is non-existant.

It will be further appreciated that the operation of the clutches and synchronizers can be carried out either hydraulically or electrically under either manual control of under the control of a computer controlled system for example.

Figure 2:
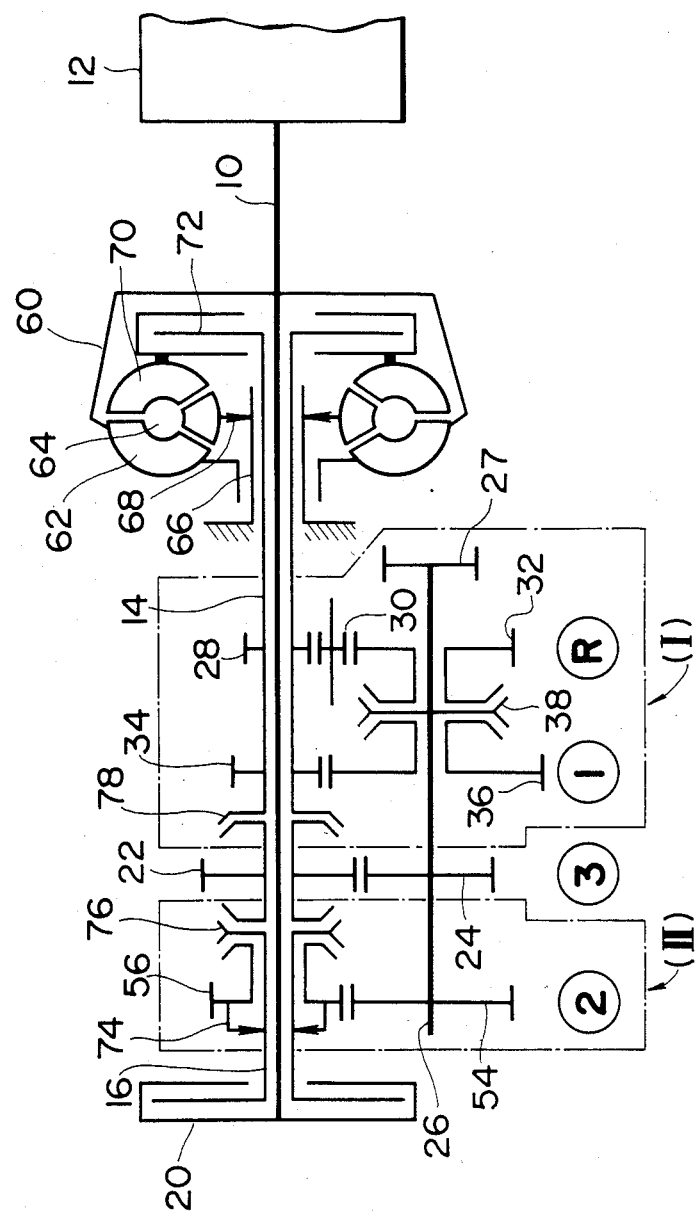
FIG. 2 is a schematic diagram of a second embodiment of the present invention.

FIG. 2 shows a second embodiment of the present invention which takes the form of a three speed transmission (viz., a transmission having three forward speeds and one reverse). This arrangement further features, for the purpose of smoothing out start-up of the vehicle and/or sudden requirements for torque multiplication, the use of a "fluid coupling" (as the first clutch). In this embodiment the first clutch takes the form of a "lock-up type" torque converter 60.

As shown, the torque converter includes a pump impeller 62 connected to the input shaft 10 for synchronous rotation therewith, a stator 64 mounted on a stationary sleeve shaft 66 through a one-way clutch 68 and a turbine runner 70. A lock-up clutch 72 is operatively disposed within the torque converter unit and arranged to provide a positive drive connection between the input shaft 10 and the first intermediate shaft 14 upon being coupled.

As in the previous embodiment the first and second groups of input and output gears (I) and (II) are disposed physically on either side of the third speed ratio input and output gears 22 and 24. The construction of the first group (I) is similar to that of the first embodiment with the exception that the fourth speed ratio input and output gears are omitted. The second group (II) on the other hand, contains only the second speed ratio input and output gears 56, 54. In this arrangement the second speed ratio output gear 54 is fixedly connected to the output shaft 26 while the corresponding input gear 56 is rotatably mounted on the second intermediate shaft 16 and interconnected therewith through a one-way clutch 74. A further difference in this arrangement comes in that the synchronizer 76, disposed at the end of the second intermediate shaft is arranged to selectively connect the third speed ratio input gear 22 or the second speed ratio one 56 thereto, while the synchronizer 78 disposed at the end of the first intermediate shaft 14 is operative to connect only the third speed ratio input gear 22 to same.

With this arrangement, start-up of the vehicle is accomplished by firstly moving the synchronizer 38 to a position to couple the output gear 36 to the output shaft 26 whereafter as power is transmitted to the first intermediate shaft 14 through the torque converter, the output pinion 27 is driven to rotate.

A 1-2 upshift is subsequently carried out by simply coupling the clutch 20 and uncoupling the lock-up clutch 72 (if coupled). This sets up a power transmission path through the clutch 20, intermediate shaft 16, one-way clutch 74 and input and output gears 56, 54 to the output shaft 26. It will be noted that under these conditions the synchronizer 38 is no longer biased to engage the output gear 36 and automatically returns to a neutral position whereby any rotational energy being transmitted through the torque converter merely rotates the intermeshed gears 28, 32 and 34, 36 without effect.

For a 2-3 shift the only step necessary is to move the synchronizer 76 to the third speed position viz., a position wherein it couples the third speed ratio input gear 22 to the second intermediate shaft 16. This establishes a power transmission path through the input shaft 10, clutch 20, second intermediate shaft 16, synchronizer 76 and third speed ratio input and output gears 22, 24. It will be noted that the one-way clutch 74 permits the output gear 54 to drive the input gear 56 at a higher RPM than the intermediate shaft 16, viz., the one-way clutch permits the input gear 56 to outrun the intermediate shaft 16.

To carry out a 3-2 downshift, firstly the synchronizer 78 is moved to couple the input gear 22 to the first intermediate shaft 14 and thereafter the clutch 72 coupled and the clutch 20 uncoupled. This maintains the third gear ratio. Subsequently the synchronizer 76 is allowed to move back to its neutral position (one in which neither gear 22 or 56, is engaged), the clutch 20 coupled and the clutch 72 uncoupled. This re-establishes the afore-mentioned power transmission path through the one-way clutch 74. However, under these conditions the one-way clutch prevents "engine-braking", thus in the case such an effect is desired, the synchronizer 76 may simply be moved to couple the input gear 56 with the second intermediate shaft 16.

To perform a 1-3 upshift, the synchronizer 76 is conditioned to couple the third speed ratio input gear 22 to the second intermediate shaft 16 whereafter the clutch 20 is coupled and the clutch 72 uncoupled.

A 3-1 downshift is carried out by coupling the output gear 36 to the output shaft 26 via the synchronizer 38, coupling the clutch 72 and uncoupling the clutch 20.

It will be noted that all of the synchronizers in the above disclosed arrangements are adapted to return to a neutral position subsequent to a shift being carried out in readiness for the preparation for the next shift.

An example of an electronically controlled hydraulic servo system which may be used to engage the synchronizers of the above disclosed embodiments may be found in U.S. Pat. No. 4,194,608 issued on Mar. 25, 1980 to Usui et al with reference to FIGS. 3A-3D and 7.

What is claimed is:

1. A transmission comprising:
   an input shaft operatively connected with a source of rotational energy;
   a first intermediate shaft rotatably disposed about said input shaft;
   first clutch means for selectively providing a drive connection between said input shaft and said first intermediate shaft;
   a second intermediate shaft rotatably disposed about said input shaft;
   second clutch means for selectively providing a drive connection between said input shaft and said second intermediate shaft;
   an output shaft;
   a first input gear located between said first and second intermediate shafts and arranged to rotatable with respect to said input shaft;
   a first output gear on said output shaft, said first output gear being arranged to be in constant means with said first input gear;
   a first group of intermeshing input and output gears comprising second and third gears fixed on said first intermediate shaft for synchronous rotation therewith and second and third output gears rotatably mounted on said output shaft;
   a second group of intermeshing input and output gears comprising a fourth input gear rotatably mounted on said second intermediate shaft and a fourth output gear fixed to said output shaft; and
   synchronizer means for selectively connecting input and output gears with said input shaft, said first and second intermediate shafts and said output shaft in a manner for selectively producing a predetermined number of speed change ratios between said input and output shafts.

2. A transmission as claimed in claim 1, further comprising a one-way clutch interconnecting said fourth input gear with said second intermediate shaft.

3. A transmission as claimed in claim 2 wherein said synchronizer means takes the form of:
   a first synchronizer for selectively interconnecting said first intermediate shaft and said first input gear;
   a second synchronizer for selectively interconnecting one of said first input gear and said fourth input gear to said second intermediate shaft; and
   a third synchronizer for selectively interconnecting one of said second and third output gears to said output shaft.

4. A transmission as claimed in claim 1 wherein said first group further comprises a fifth input gear rotatably disposed on said first intermediate shaft and a fifth output gear mounted on said output shaft for synchronous rotation therewith and wherein said second group further includes a sixth input gear mounted on said second intermediate shaft for synchronous rotation therewith and a sixth output gear rotatably mounted on said output shaft.

5. A transmission as claimed in claim 1 wherein said synchronizer means takes the form of:
   a first synchronizer for selectively interconnecting one of said first input gear and said fifth input gear with said first intermediate shaft;
   a second synchronizer unit for selectively interconnecting one of said first input gear and said fourth input gear with said second intermediate shaft;
   a third synchronizer for selectively interconnecting one of said second output gear and said third output gear with said output shaft; and
   a fourth synchronizer for selectively connecting said sixth output gear with said output shaft.

6. A transmission as claimed in claim 1, further comprising an idler gear operatively interconnecting said second input gear and said second output gear.

7. A transmission as claimed in claim 1 wherein said first input gear is located on said input shaft.

8. A transmission as claimed in claim 1 wherein said first clutch means includes a torque converter and a lock-up clutch.

9. A transmission as claimed in claim 1 wherein the input and output gears of said first and second groups are selected so that the speed change ratios produced by any two gears in each group are the first and last of a series of four consecutive speed change ratios.

10. A transmission as claimed in claim 1 wherein said first clutch means includes a torque converter and a lock-up clutch.

11. A transmission as claimed in claim 1 wherein said first input gear and said output gear produces a third transmission speed ratio.

* * * * *